United States Patent
Nishikiori et al.

(10) Patent No.: US 12,412,706 B2
(45) Date of Patent: Sep. 9, 2025

(54) VACUUM CAPACITOR

(71) Applicant: MEIDENSHA CORPORATION, Tokyo (JP)

(72) Inventors: Yuichi Nishikiori, Shinagawa-ku (JP); Takuya Shimokawa, Shinagawa-ku (JP); Yoshiyuki Tanimizu, Shinagawa-ku (JP); Toru Tanimizu, Shinagawa-ku (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 19/115,177

(22) PCT Filed: Aug. 29, 2023

(86) PCT No.: PCT/JP2023/031138
§ 371 (c)(1),
(2) Date: Mar. 25, 2025

(87) PCT Pub. No.: WO2024/070401
PCT Pub. Date: Apr. 4, 2024

(65) Prior Publication Data
US 2025/0259798 A1    Aug. 14, 2025

(30) Foreign Application Priority Data
Sep. 27, 2022   (JP) ................. 2022-153213

(51) Int. Cl.
*H01G 5/014*   (2006.01)
*H01G 5/14*    (2006.01)

(52) U.S. Cl.
CPC .............. *H01G 5/014* (2013.01); *H01G 5/14* (2013.01)

(58) Field of Classification Search
CPC ....... H01G 2005/02; H01G 5/14; H01G 5/014
See application file for complete search history.

(56) References Cited

U.S. PATENT DOCUMENTS

| | | | | |
|---|---|---|---|---|
| 2,899,612 A | * | 8/1959 | Jennings | H01G 5/01 |
| | | | | 174/12 R |
| 6,268,995 B1 | * | 7/2001 | Beuerman | H01G 5/00 |
| | | | | 361/278 |

(Continued)

FOREIGN PATENT DOCUMENTS

| | | |
|---|---|---|
| JP | S62-172407 U | 11/1987 |
| JP | H04-074416 U | 6/1992 |

(Continued)

*Primary Examiner* — David M Sinclair
(74) *Attorney, Agent, or Firm* — Foley & Lardner LLP

(57) ABSTRACT

A vacuum capacitor is provided with a vacuum container accommodating a fixed electrode and movable electrode to ensure capacitance, and a vacuum expansion container communicating with the vacuum container in series. The vacuum container is provided with a movable support part supporting the movable electrode, a movable conductor supporting the movable support part to enable reciprocation in the axial direction of the vacuum container, a fixed conductor supporting the fixed electrode, and a main bellows interposed between the movable support part and the movable conductor. The vacuum expansion container is provided with a movable part arranged coaxially with the movable support part, and an adjustment bellows interposed between the movable part and the inner end surface of the vacuum expansion container. The movable support part and movable part are connected by an insulating connection rod arranged coaxially with the fixed electrode and movable electrode.

5 Claims, 2 Drawing Sheets

(56) References Cited

U.S. PATENT DOCUMENTS

| | | | |
|---|---|---|---|
| 9,805,873 B2 | 10/2017 | Mildner et al. | |
| 12,300,443 B2 * | 5/2025 | Lai | H01G 5/145 |
| 2016/0093445 A1 | 3/2016 | Mildner et al. | |

FOREIGN PATENT DOCUMENTS

| | | | |
|---|---|---|---|
| JP | 2007-116025 A | 5/2007 |
| JP | 2016-522577 A | 7/2016 |
| JP | 2016-522995 A | 8/2016 |

* cited by examiner

VACUUM CAPACITOR

TECHNICAL FIELD

The present invention relates to a vacuum capacitor used, for example, for adjusting the impedance of high-frequency apparatus such as high-frequency power supplies and high-power transmission circuits in semiconductor facilities.

BACKGROUND TECHNOLOGY

Various vacuum capacitors have traditionally been used in high-frequency apparatus such as high-frequency power supplies and high-power transmission circuits in general semiconductor facilities for impedance adjustment. Recently, the operation speed of apparatus related to high-frequency apparatus has become faster, and there is also a growing demand for vacuum capacitors to reduce operating force in order to support high-speed operation.

FIG. 2 is a schematic sectional diagram showing one example of a general vacuum capacitor. A vacuum container 1 is formed in a cylindrical shape by a flange pipe 3 at one end and a flange pipe 4 at the other end of an insulating ceramic tube 2, and one of the both ends is sealed with a metal fixed conductor 5 and the other end is sealed with a metal movable conductor 6.

A fixed electrode 7 is composed of a plurality of thin cylindrical electrode members having different diameters which are arranged at regular intervals on the same axis, and is provided on the vacuum container 1 inner side of the fixed conductor 5. Similar to the fixed electrode 7, a movable electrode 8 is composed of a plurality of thin cylindrical electrode members having different diameters which are arranged at regular intervals on the same axis. The individual electrode members of the movable electrode 8 are inserted and removed in a state of intersecting with those of the fixed electrode 7, ensuring minute gaps with the fixed electrode 7 to obtain capacitance. This movable electrode 8 is provided on a movable support part 9 made of copper material, which can adjust the degree of insertion and removal with respect to the fixed electrode 7 in an axial direction Y of the vacuum container 1.

A hollow movable rod 10 is provided extending from the back side of the movable electrode 8 of the movable support part 9 in the axial direction Y of the vacuum container 1 so as to protrude from the movable conductor 6. The movable rod 10 slidably guides and supports the movable support part 9 in the axial direction Y of the vacuum container 1 via a bearing member 11 fixed to the movable conductor 6, with a gap between the outer peripheral surface of the movable rod 10 and the bearing member 11.

A male screw portion 12b at one end of an operating rod 12 is screwed into a female screw portion 10a on the inner wall at one end of the movable rod 10, and an operating rod head 12a at the other end is connected to a driving source of a vacuum capacitor, such as a motor. In addition, the operating rod 12 is supported by an operating rod support part 13, which is composed of a screw receiving portion 13a and a thrust bearing 13b that protrude from the movable conductor 6 provided to the vacuum container 1 and cover the bearing member 11, so as to be freely rotatable while receiving a main retraction force F1.

The operating rod 12 guides and moves the movable rod 10 in the axial direction Y of the vacuum container 1, using the bearing member 11, and the capacitance of the vacuum capacitor is obtained by the facing area of the fixed electrode 7 and the movable electrode 8.

A main bellows 14 has a bellows shape and is made of a thin and flexible metal. The main bellows 14 is configured to allow the movable electrode 8, movable support part 9 and movable rod 10 to move in the axial direction Y while maintaining airtightness of a vacuum chamber 15 enclosed by the fixed electrode 7, movable electrode 8 and main bellows 14 in the vacuum container 1. One end of the main bellows 14 is joined to the inner wall of the movable conductor 6, and the other end is joined to the movable support part 9. An atmospheric chamber 16 having the atmospheric pressure is formed on the movable rod 10 side of the main bellows 14 within the vacuum container 1.

The main bellows 14 has a vacuum pressure F1$v$ that is always pulling in the direction of the vacuum container, which is determined by the diameter of the main bellows 14. Furthermore, in the operation range in 100% in total of 50% expansion and 50% contraction based on the initial length of the manufacture, plural expansion and contraction operation life is obtained from the allowable stress during expansion and contraction, and an expansion and contraction force F1$b$ in accordance with the spring constant associated with expansion and contraction is set. A main retraction force F1 is the total force of the vacuum pressure F1$v$, the expansion and contraction force F1$b$, and the sliding friction of the main bellows 14.

In the vacuum capacitor mentioned above, when the driving source such as a motor rotates the operating rod 12 to move the moving rod 10 in the axial direction Y of the vacuum container 1, the area of intersection between the fixed electrode 7 and the movable electrode 8 changes, and consequently, the capacitance is controlled to adjust the impedance.

PRIOR ART REFERENCE(S)

Patent Document(s)

Patent Document 1: Japanese Patent Application Publication No. 2007-116025
Patent Document 2: U.S. Pat. No. 9,805,873

SUMMARY OF THE INVENTION

Of the main retraction force F1 of the main bellows 14 relative to the movable rod 10, the force of the vacuum pressure F1$v$ is constant and large. Furthermore, the expansion and contraction force F1$b$ changes depending on the operating position (capacitance value). Since the main retraction force F1 is large and fluctuates, it becomes difficult to perform high-speed control and fine adjustment of the capacitance.

The present invention is made in consideration of such a situation, and an object of the present invention is to perform high-speed control and fine adjustment of capacitance by reducing the operating force of the electrodes that ensure the capacitance.

Therefore, the present invention, in one aspect thereof, is a vacuum capacitor including: a vacuum container which accommodates a pair of electrodes which are capable of ensuring capacitance; and a vacuum expansion container which communicates with the vacuum container in series, wherein the vacuum container includes: a movable support part which supports one electrode of the pair of electrodes; one conductor which supports the movable support part to enable reciprocation in an axial direction of the vacuum container; an other conductor which supports an other electrode of the pair of electrodes; and a main bellows which is interposed between the movable support part and the one conductor, wherein the vacuum expansion container includes: a movable part arranged coaxially with the movable support part; and an adjustment bellows which is interposed between the movable part and an inner surface of an end portion of the vacuum expansion container, and wherein the movable support part and the movable part are connected by an insulating connection rod arranged coaxially with the pair of electrodes.

In the vacuum capacitor in one aspect of the present invention, an operating rod which operates the movable support part or the movable part is provided on an atmospheric side.

In the vacuum capacitor in one aspect of the present invention, the adjustment bellows has a vacuum pressure equal to or less than that of the main bellows.

In the vacuum capacitor in one aspect of the present invention, the main bellows and the adjustment bellows have a same spring constant and an expansion and contraction rate.

In the vacuum capacitor in one aspect of the present invention, the main bellows and the adjustment bellows each are set to have an operation range of a 50% expansion and 50% contraction relative to an initial length at a time of manufacture.

In the vacuum capacitor in one aspect of the present invention, the other conductor is formed with a through hole through which the insulating connection rod is inserted, and the vacuum container and the vacuum expansion container communicate with each other via the through hole.

According to the present invention, the operating force of the electrodes that ensure the capacitance can be reduced, thereby performing high-speed control and fine adjustment of the capacitance.

MODE FOR IMPLEMENTING THE INVENTION

Figure 1:
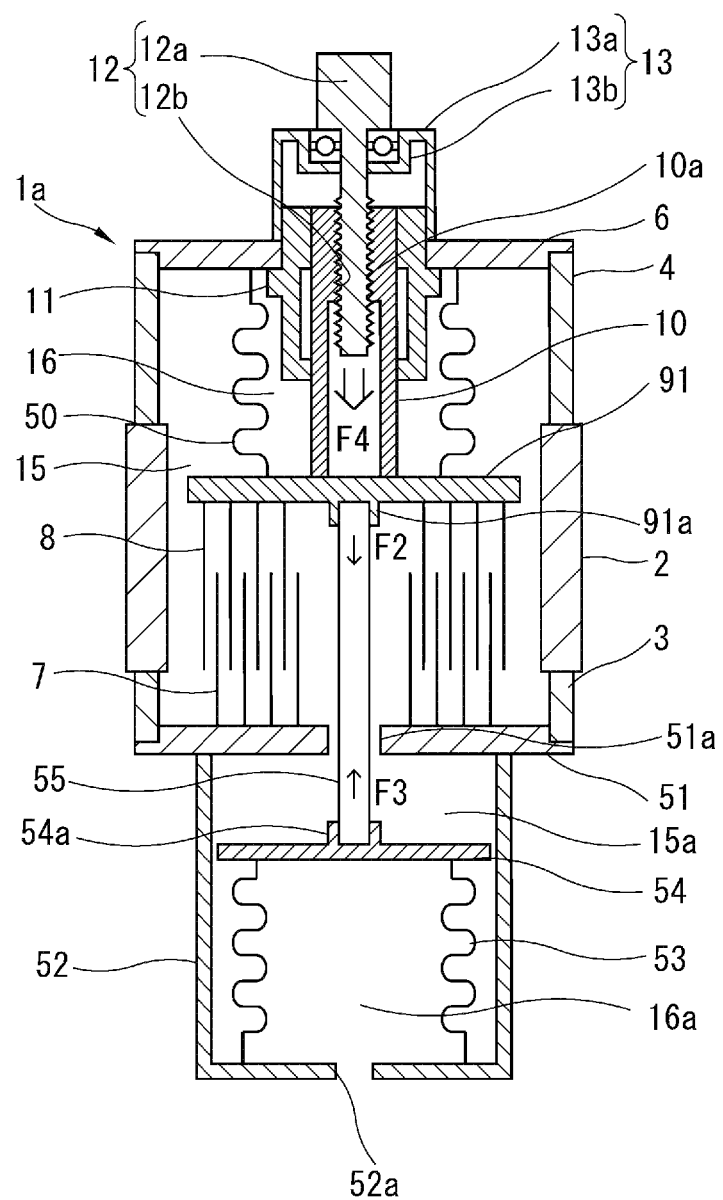
FIG. 1 is a schematic sectional diagram of a vacuum capacitor in a first embodiment of the present invention.
Figure 2:
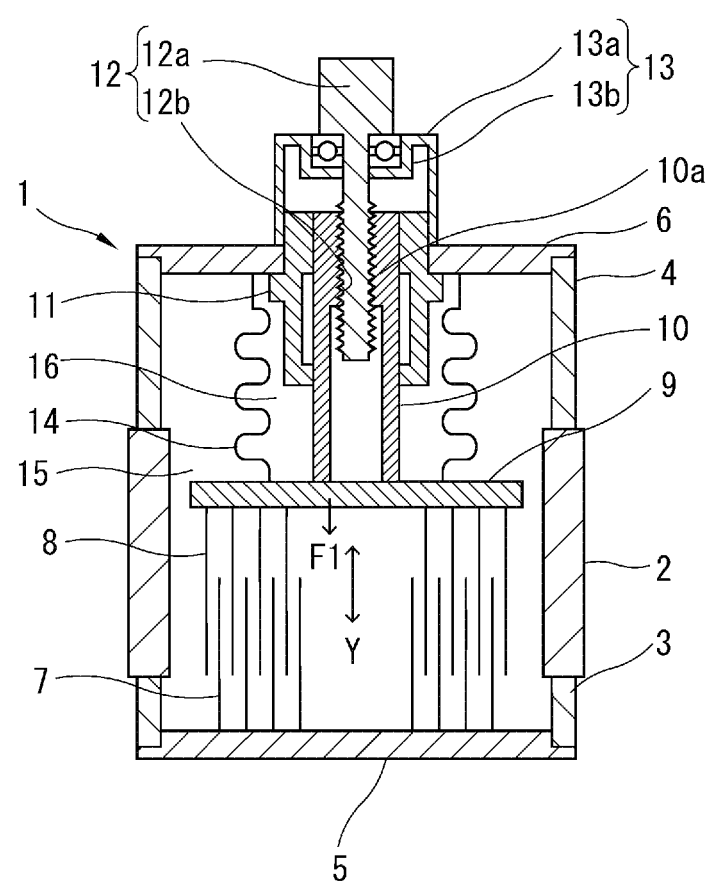
FIG. 2 is a schematic sectional diagram of a conventional vacuum capacitor.

In the following, an embodiment of the present invention will be explained by referring to the drawings.

A vacuum capacitor in a first embodiment that is one aspect of the present invention in FIG. 1 is provided with a vacuum container 1a which accommodates a fixed electrode 7 (other electrode) and a movable electrode 8 (one electrode), which are a pair of electrodes that are capable of ensuring capacitance, and a vacuum expansion container 52 that communicates with the vacuum container 1a in series.

The vacuum container 1a is composed of and sealed by a ceramic tube 2, flange tubes 3 and 4, a fixed conductor 51 and a movable conductor 6.

The ceramic tube 2 is arranged coaxially with the fixed electrode 7 and the movable electrode 8 inside the vacuum container 1a.

The flange tube 3 is interposed between one end of the ceramic tube 2 and the fixed conductor 51 (other conductor) on the same axis mentioned above.

The flange tube 4 is interposed between the other end of the ceramic tube 2 and the movable conductor 6 (one conductor) on the same axis mentioned above.

The fixed electrode 7 is provided to the fixed conductor 51 in the inside of the vacuum container 1a and is composed of a plurality of electrode members which have thin plate and substantially cylindrical shapes, have different diameters, and are arranged coaxially at regular intervals.

The movable electrode 8 is provided to a movable support part 91, which can reciprocate in an axial direction Y of the vacuum container 1a, and is composed of electrode members which have thin plate and substantially cylindrical shapes, have different diameters, and are arranged coaxially at regular intervals such that an arbitrary capacitance can be ensured between the movable electrode 8 and the fixed electrode 7.

A movable rod 10 that reciprocates in the axial direction Y by an operating rod 12 is provided in the center of the back side of the movable support part 91 which is a side opposite to the side of the movable electrode 8. The movable rod 10 is surrounded by a main bellows 50 which is interposed between the movable conductor 6 and the movable support part 91, and is supported coaxially with the flange tube 4 by a bearing member 11 in the movable conductor 6.

The operating rod 12 includes, on one side thereof, a male screw portion 12b which is screwed into a female screw portion 10a of the movable rod 10, and, on the other side thereof, an operating rod head 12a which is connected to a driving source of the vacuum capacitor, such as a motor, and is rotatably supported by an operating rod support part 13 in the movable conductor 6.

The operating rod support part 13 is composed of a screw receiving portion 13a provided to the movable conductor 6 to cover the bearing member 11 on the atmospheric side of the movable conductor 6, and a thrust bearing 13b which reduces the rotational torque of the operating rod 12 at the screw receiving portion 13a. With this operating rod support part 13, by the rotation of the operating rod 12 by a driving source such as a motor, the movable rod 10 moves in the axial direction Y while being guided by the bearing member 11. Consequently, the facing area of the movable electrode 8 and the fixed electrode 7 becomes variable, and a desired capacitance can be obtained.

The main bellows 50 has a bellows shape and is made of a copper alloy or copper-plated flexible thin metal, and is expandable and contractible in the axial direction Y of the vacuum container 1a. The main bellows 50 is arranged coaxially with the flange tube 4, and one end of the main bellows 50 is joined to the inner wall of the movable conductor 6, and the other end is joined to the movable support part 91 to surround the movable rod 10, so as to airtightly maintain the vacuum chamber 15 with the fixed electrode 7 and movable electrode 8. In addition, an atmospheric chamber 16 under the atmospheric pressure state is formed on the movable rod 10 side of the main bellows 50 in the vacuum container 1a.

A through hole 51a is formed in the center of the fixed conductor 51, through which an insulating connection rod 55 connected to the movable support part 91 is inserted. One end of the insulating connection rod 55 is fixed to a fixed seat 91a in the center of the movable electrode 8 side of the movable support part 91, while the other end is fixed to a fixed seat 54a of the movable part 54 through the through hole 51a of the fixed conductor 51.

On the atmospheric side of the fixed conductor 51, a vacuum expansion container 52 having a cylindrical shape with a bottom and a smaller diameter than the ceramic tube 2 and the flange tubes 3 and 4 is disposed.

The vacuum expansion container 52 is provided with a movable part 54 connected to the insulating connection rod 55 introduced through the through hole 51a of the fixed conductor 51, and an adjustment bellows 53 interposed between the movable part 54 and the inner bottom surface of the vacuum expansion container 52.

The adjustment bellows 53 is interposed between the movable part 54 and the inner surface of an end portion of the vacuum expansion container 52. In particular, the adjustment bellows 53 is set to have a spring constant, which is the same as that of the main bellows 50, and a vacuum pressure equal to or less than that of the main bellows 50, and the vacuum chamber 15a, which is formed by the fixed conductor 51, movable part 54 and adjustment bellows 53, is airtightly maintained and the movable part 54 and insulating connection rod 55 are provided in the vacuum expansion container 52 so as to be movable in the axial direction Y. Inside the adjustment bellows 53, the atmospheric chamber 16a under the atmospheric pressure state is formed by a suction and exhaust hole 52a at the bottom of the vacuum expansion container 52. An adjusting retraction force F3 of the adjustment bellows 53 is the total of a vacuum pressure F3v and an expansion and contraction force F3b of the adjustment bellows 53.

As described above, the main bellows 50, the insulating connection rod 55 and the adjustment bellows 53 are arranged in series in the axial direction Y, and an operating rod, which is omitted from the illustration, is further provided on the atmospheric side of the main bellows 50 or the adjustment bellows 53.

According to the vacuum capacitor in the present embodiment, by the rotation of the operating rod 12 by a driving source such as a motor in the atmosphere, the movable rod 10 and the movable support part 91 move in the axial direction Y, and the main bellows 50 expands and contracts, and the facing area between the fixed electrode 7 and the movable electrode 8 varies. Consequently, the capacitance by the fixed electrode 7 and the movable electrode 8 can be controlled, and the impedance is adjusted as desired. Linked with this, the insulating connection rod 55 expands and contracts the adjustment bellows 53 via the movable part 54 in the vacuum chamber 15a through the through hole 51a of the fixed conductor 51, and the main retraction force F2 and the adjustment retraction force F3 become forces in opposite directions that cancel each other out, such that a total retraction force F4 becomes only sliding friction.

As described above, the total retraction force F4 is reduced by the cancellation of the main retraction force F2 of the main bellows 50 and the adjustment retraction force F3 of the adjustment bellows 53. The insulating connection rod 55, which is arranged between the main bellows 50 of the vacuum chamber 15 and the adjustment bellows 53 of the vacuum chamber 15a, is insulated in a vacuum and the creep distance is reduced, and it can be applied as a compressive force with high allowable stress, thereby reducing the cross-section and diameter of the insulating connection rod 55.

In addition, since the operating rod 12 is arranged on the atmospheric chamber 16 side of the main bellows 50 on the same axis as the main bellows 50, the insulating connection rod 55 and the adjustment bellows 53, a drive source such as a motor connected to the operating rod 12 can be disposed in the atmosphere, and thereby maintenance and inspection become easier.

Moreover, if the vacuum pressure F3v of the adjustment bellows 53 is equal to the vacuum pressure F2v of the main bellows 50, the vacuum pressures F3v and F2v cancel each other out, and if the vacuum pressure F3v is equal to or less than the vacuum pressure F2v, the total retraction force F4 corresponding to the reduction in vacuum pressure based on the conditions of a driving source such as a motor is generated.

Then, the expansion and contraction force F2b of the main bellows 50 and the expansion and contraction force F3b of the adjustment bellows 53 have the same spring constant and expansion and contraction rate, and the expansion and contraction force F3b of the adjustment bellows 53 becomes a force in the opposite direction to the expansion and contraction force F2b of the main bellows 50. Therefore, by connecting the main bellows 50 and the adjustment bellows 53 via the insulating connection rod 55, the expansion and contraction forces F2b and F3b cancel each other out, and the total retraction force F4 can be reduced.

In addition, by setting each of the main bellows 50 and the adjustment bellows 53 to have an operating range in 100% in total of 50% expansion and 50% contraction relative to the initial length at the time of manufacture, the expansion and contraction force F2b of the main bellows 50 is the same as the expansion and contraction force F3b of the adjustment bellows 53, and they become forces acting in opposite directions to each other. Therefore, the expansion and contraction forces F2b and F3b cancel each other out by the connection mentioned above, and the total retraction force F4 can be reduced.

Further, the vacuum chamber 15 of the vacuum container 1a communicates with the vacuum chamber 15a of the vacuum expansion container 52 by connecting the vacuum container 1a and the vacuum expansion container 52 via the fixed conductor 51 formed with the through hole 51a through which the insulating connection rod 55 is inserted. Consequently, vacuum brazing and vacuum maintenance are combined into a single process, and thereby a plurality of manufacturing and assembly process for a sealed container becomes unnecessary.

Then, the insulating connection rod 55 is thinly constructed for pressure resistance and is introduced into the vacuum expansion container 52 on the same axis as the fixed electrode 7 and the movable electrode 8. Consequently, the insulating connection rod 55 can be joined to the adjustment bellows 53 inside the vacuum expansion container 52 without affecting the facing area (capacitance) of the fixed electrode 7 and the movable electrode 8.

In addition, since by the through hole 51a through which the insulating connection rod 55 is inserted, the insulating connection rod 55 is in a non-sliding state, as a result of which the movable mechanism of the vacuum capacitor can be achieved with only the bearing member 11, and the misalignment that occurs in the case of a multi-point sliding guide structure is suppressed, and core adjustment is no longer necessary.

As the above, according to the present embodiment, the total retraction force F4 can be a stable force and is easily finely adjusted, such that high-speed control can be performed by providing a driving source, such as a motor, in the atmosphere.

In the first embodiment in FIG. 1, the operating rod 12 is provided on the atmosphere chamber 16 side of the main bellows 50, but it may also be provided on the atmosphere chamber 16a side of the adjustment bellows 53.

The invention claimed is:
1. A vacuum capacitor comprising:
 a vacuum container which accommodates a pair of electrodes which are capable of ensuring capacitance; and
 a vacuum expansion container which communicates with the vacuum container in series, wherein the vacuum container includes:
    a movable support part which supports one electrode of the pair of electrodes;
    one conductor which supports the movable support part to enable reciprocation in an axial direction of the vacuum container;
    an other conductor which supports an other electrode of the pair of electrodes; and
    a main bellows which is interposed between the movable support part and the one conductor,
wherein the vacuum expansion container includes:
    a movable part arranged coaxially with the movable support part; and
    an adjustment bellows which is interposed between the movable part and an inner surface of an end portion of the vacuum expansion container,
wherein the movable support part and the movable part are connected by an insulating connection rod arranged coaxially with the pair of electrodes,
wherein the other conductor is formed with a through hole through which the insulating connection rod is inserted, and
wherein the vacuum container and the vacuum expansion container communicate with each other via the through hole.

2. The vacuum capacitor according to claim 1, wherein an operating rod which operates the movable support part or the movable part is provided on an atmospheric side.

3. The vacuum capacitor according to claim 1, wherein the adjustment bellows has a vacuum pressure equal to or less than that of the main bellows.

4. The vacuum capacitor according to claim 1, wherein the main bellows and the adjustment bellows have a same spring constant and an expansion and contraction rate.

5. The vacuum capacitor according to claim 1, wherein the main bellows and the adjustment bellows each have a 50% expansion and 50% contraction relative to an initial length at a time of manufacture.

* * * * *